United States Patent
Wei et al.

(10) Patent No.: US 7,563,427 B2
(45) Date of Patent: Jul. 21, 2009

(54) CONTINUOUS MASS PRODUCTION OF CARBON NANOTUBES IN A NANO-AGGLOMERATE FLUIDIZED-BED AND THE REACTOR

(75) Inventors: Fei Wei, Beijing (CN); Yao Wang, Beijing (CN); Guohua Luo, Beijing (CN); Hao Yu, Department of Chemical Engineering Tsinghua University (CN); Zhifei Li, Beijing (CN); Weizhong Qian, Beijing (CN); Zhanwen Wang, Beijing (CN); Yong Jin, Beijing (CN)

(73) Assignee: Tsinghua University (CN)

( * ) Notice: Subject to any disclaimer, the term of this patent is extended or adjusted under 35 U.S.C. 154(b) by 788 days.

(21) Appl. No.: 10/478,512

(22) PCT Filed: Jan. 29, 2002

(86) PCT No.: PCT/CN02/00044

§ 371 (c)(1),
(2), (4) Date: Nov. 24, 2003

(87) PCT Pub. No.: WO02/094713

PCT Pub. Date: Nov. 28, 2002

(65) Prior Publication Data

US 2004/0151654 A1  Aug. 5, 2004

(30) Foreign Application Priority Data

May 25, 2001  (CN) ............................ 01 1 18349

(51) Int. Cl.
*D01F 9/12* (2006.01)
(52) U.S. Cl. .................. 423/447.3; 423/447.1; 977/843
(58) Field of Classification Search ............... 423/447.1, 423/445 B, 447.3; 977/742, 840, 842, 843
See application file for complete search history.

(56) References Cited

U.S. PATENT DOCUMENTS 4,650,657 A * 3/1987 Brooks ........................ 423/461

(Continued)

FOREIGN PATENT DOCUMENTS

CN  1315291  3/2000

(Continued)

OTHER PUBLICATIONS

Wang, et al., The large-scale production of carbon nanotubes in a nano-agglomerate fluidized-bed reactor, Chem. Phys. Ltrs. 2002; 364: 568-572.*

(Continued)

*Primary Examiner*—Stuart L. Hendrickson
*Assistant Examiner*—Daniel C. McCracken
(74) *Attorney, Agent, or Firm*—Townsend and Townsend and Crew LLP

(57) ABSTRACT

The present invention relates to a method for continuous production of carbon nanotubes in a nano-agglomerate fluidized bed, which comprises the following steps: loading transition metal compounds on a support, obtaining supported nanosized metal catalysts by reducing or dissociating, catalytically decomposing a carbon-source gas, and growing carbon nanotubes on the catalyst support by chemical vapor deposition of carbon atoms. The carbon nanotubes are 4~100 nm in diameter and 0.5~1000 μm in length. The carbon nanotube agglomerates, ranged between 1~1000 μm, are smoothly fluidized under 0.005 to 2 m/s superficial gas velocity and 20~800 kg/m$^3$ bed density in the fluidized-bed reactor. The apparatus is simple and easy to operate, has a high reaction rate, and it can be used to produce carbon nanotubes with high degree of crystallization, high purity, and high yield.

15 Claims, 4 Drawing Sheets

U.S. PATENT DOCUMENTS

| | | | |
|---|---|---|---|
| 4,663,230 A | | 5/1987 | Tennent |
| 5,500,200 A | | 3/1996 | Mandeville et al. |
| 5,653,951 A | * | 8/1997 | Rodriguez et al. ............ 423/439 |
| 6,413,487 B1 | * | 7/2002 | Resasco et al. ............ 423/447.3 |
| 6,919,064 B2 | * | 7/2005 | Resasco et al. ............ 423/447.3 |
| 6,955,800 B2 | * | 10/2005 | Resasco et al. ............ 423/447.3 |

FOREIGN PATENT DOCUMENTS

| | | | |
|---|---|---|---|
| CN | 1266018 | | 9/2000 |
| CN | 1266018 A | * | 9/2000 |
| CN | 1277145 | | 12/2000 |
| EP | 0147839 | | 7/1985 |
| JP | 11-310407 | | 11/1999 |
| JP | 2000-203819 | | 7/2000 |
| WO | WO 01/94260 | | 12/2001 |
| WO | WO 01/94260 A1 | * | 12/2001 |

OTHER PUBLICATIONS

Liu, et al., Production of Carbon Nanotubes over Pre-reduced LaCoO3 Using Fluidized-bed Reactor, Chinese Chemical Letters 2000; 11(11): 1031-1034.*

Hernadi, et al., Fe-Catalyzed Carbon Nanotube Formation, Carbon 1996; 34(10) 1249-1257.*

Stercel, et al., Single Wall Carbon Nanotubes Filled with Metallocenes: a first Example of Non-Fullerence Peapods, Department of Materials Science & Engineering Departmental Papers, University of Pennsylvania (2001).*

Andrews, et al., Continuous production of aligned carbon nanotubes: a step closer to commercial realization, Chem. Phys. Ltrs. 1999; 303: 467-474.*

Journet, et al., Production of carbon nanotubes, Appl. Phys. A 1998; 67: 1-7.*

Liu et al., "Production of carbon nanotubes over pre-reduced LaCOO3 using fluidized-bed reactor," Chinese Chemical Letters, 2000, vol. 11, pp. 1031-1034.

Hernadi et al., "Fe-catalyzed carbon nanotubes formation," Carbon; Elsevier, New York, vol. 34, 1996, pp. 1249-1257.

English Abstracts for Chinese Patents—CN1266018,CN1277145 and CN1315291.

* cited by examiner

CONTINUOUS MASS PRODUCTION OF CARBON NANOTUBES IN A NANO-AGGLOMERATE FLUIDIZED-BED AND THE REACTOR

FIELD OF THE INVENTION

The present invention relates to a method and reaction apparatus for continuous production of carbon nanotubes in a nano-agglomerate fluidized bed.

BACKGROUND OF THE INVENTION

It is more than a decade since the first report on carbon nanotube as a new material. The exceptional mechanical and electrical properties of carbon nanotube have attracted intensive attention of physicists, chemists and material scientists worldwide, however, its commercial application has not been realized yet. The reasons lie in two interrelated aspects: the difficulty in mass production of carbon nanotubes and hence the high production cost. For instance, the international market price of carbon nanotubes of 90% purity is as high as $60/g, which is 5 times that of gold. It is reported that the highest production rate of carbon nanotubes till now is only 200 g/h (MOTOO YUMURA et al., CNT10, October 2001, p. 31). There are also reports forecasting that industrial application of carbon nanotubes will remain unpractical until its price falls below $2/pound, i.e. 0.4 cent/g, and it needs a production rate of 10,000,000 pound per year or about 12.5 tons per day to bring the price down to this level. Thus, in order to take carbon nanotubes from laboratory to market, mass production of high-quality carbon nanotubes is one of the principal challenges to take.

Novel process and reactor technology are the keys to the mass production of carbon nanotubes. Known methods for the preparation of carbon nanotubes mainly comprise graphite arc-discharge method, catalytic arc-evaporation method and catalytic decomposition method, of which the catalytic decomposition method is the most prevalent, especially the catalytic decomposition of lower hydrocarbons. The production of carbon nanotubes by chemical vapor deposition is a process involving both a typical chemical engineering process and the special preparation process of nanometer materials. Thus a desired production method should meet the requirements of heat transfer and mass transfer in the chemical engineering process while taking the special properties of nano-materials into consideration. Carbon nanotubes are one-dimensional nano-materials that grow during the reaction, and which demand a catalyst with its active ingredients dispersed on the nano-scale and which need sufficient space for growth. For a high rate of reaction, an appropriate concentration of catalysts is also necessary.

The gas-solid fluidization technique is an efficient measure to intensify the contact between gases and solids and has been widely used in many fields, and it is particularly suitable for the preparation, processing and utilization of powders. The gas-solid fluidization technique offers many advantages, such as high throughput, large capacity of transporting/supplying heat, and easy transfer of powder products and catalysts. However, traditional gas-solid fluidized beds are only used for the fluidization of non-C-type powders with diameters larger than 30 μm (Geldart D. *Powder Technology*, 1973,7: 285). The growth of one dimensional materials and their adherence to each other in the preparation of carbon nanotubes by chemical vapor deposition tend to make fluidization difficult, and thus cause coagulation, uneven distribution of temperature and concentrations, and the deposition of carbon among particles. Therefore, there has been no report on the application of fluidized-bed reactor in continuous mass production of carbon nano-materials.

It is now known that the inter-particle forces among fine powders do not monotonically increase with the decrease of particle sizes. The intense Van der Waals force among nanometer particles can be effectively weakened in some nanomaterial systems by the formation of structurally loose agglomerates by the self-agglomeration of primary particles, which makes the said nano-materials fluidized and capable of flowing in the form of agglomerates. Chaouki et al. (*Powder Technology*, 1985, 43: 117) have reported the agglomerate fluidization of a $Cu/Al_2O_3$ aerogel. Wang et al. (*Journal of Tsinghua University*, Science and Technology Engineering, vol.41, No.4/5, April 2001, p32-35) investigated the particulate fluidization behaviors of $SiO_2$ nano-agglomerates. The agglomerate fluidization of carbon fibers was also reported by Brooks (*Fluidization V*, New York: Engineering Foundation, 1986, pp217).

SUMMARY OF THE INVENTION

The object of the present invention is to provide a method and reaction apparatus for continuous production of carbon nanotubes in a nano-agglomerate fluidized bed, wherein the agglomeration and aggregation behaviors of nano-particles are taken into consideration. Normal fluidization state or even particulate fluidization state can be realized and maintained during the whole reaction process through proper control of the structure and growth of carbon nanotubes based on the analysis of the growth, agglomeration and fluidization of carbon nanotubes during the chemical vapor deposition process. By properly adjusting the reaction rate, operating conditions and fluidized-bed structure, the reactor bed is kept in an agglomerate fluidization state, so as to realize the continuous mass production of carbon nanotubes with a high degree of crystallization, high purity, and high yield.

The present invention provides a method for continuous production of carbon nanotubes in a nano-agglomerate fluidized bed, which comprises the following steps:

1. loading transition metal oxide on a support;

2. adding said transition metal oxide catalyst into a catalyst activation reactor, flowing a mixture of nitrogen and hydrogen or carbon monoxide into the reactor at 500~900° C. to reduce the nanosized transition metal oxide particles to nanosized metal particles, wherein the volume ratio of hydrogen or carbon monoxide to nitrogen is from 1:0.3 to 1:1, the space velocity during the reduction reaction is from 0.3 h$^{-1}$ to 3h$^{-1}$ and the catalyst is in the form of nano-agglomerates, which have diameters between 1~1000 μm;

3. transporting the catalyst into a fluidized-bed reactor, flowing a mixture of hydrogen or carbon monoxide, a gas of lower hydrocarbons having less than 7 carbon atoms, and nitrogen into the reactor at 500~900° C., with the volume ratio of hydrogen or carbon monoxide:carbon-source-gas: nitrogen equals 0.4~1:1:0.1~2, wherein the space velocity during the reaction is 5~10000 h$^{-1}$, the superficial gas velocity is 0.08~2 m/s, the bed density is maintained at 20~800 kg/m$^3$, and the nano-agglomerates of the catalyst and the carbon nanotube product are kept in a dense-phase fluidization state, as a result, carbon nanotubes are obtained from the fluidized-bed reactor.

The process can be operated continuously when the catalyst and the reactants are fed continuously and the product is continuously removed out from the reactor.

According to the present invention, a second method for continuous production of carbon nanotubes in a nano-agglomerate fluidized bed comprises the following steps:

1. placing a catalyst support in the fluidized bed reactor, wherein the diameters of the agglomerates of the catalyst support are in the range of 1~1000 μm and the bed density of the reactor is 20~1500 kg/m$^3$ so that the catalyst support can be fluidized;

2. dissolving a metallocene compound in a low carbon number organic solvent;

3. heating the above solution to a temperature higher than the boiling point of the organic solvent to vaporize the solution;

4. feeding the above vaporized catalyst precursor into the fluidized-bed reactor, flowing a mixture of hydrogen or carbon monoxide, a gas of lower hydrocarbons having less than 7 carbon atoms, and nitrogen into the reactor at 500~900° C., with the volume ratio of hydrogen or carbon monoxide:carbon-source-gas:nitrogen equals 0.4~1:1:0.1~2, wherein the space velocity during the reaction is 5~10000 h$^{-1}$, the superficial gas velocity is 0.005~2 m/s, and the stuffs in the reactor are kept in a dense-phase fluidization state, as a result, carbon nanotubes are obtained from the fluidized-bed reactor.

The present invention also provides a reaction apparatus for the continuous production of carbon nanotubes in a nano-agglomerate fluidized bed, which comprises a main reactor, a catalyst activation reactor, a gas distributor, a gas-solid separator and a product degassing section. The catalyst activation reactor is connected to the main reactor, the gas distributor is placed at the bottom of the main reactor, the gas-solid separator is arranged at the top of the main reactor, heat exchange tubes are provided inside the main reactor, and means for feeding gases are provided at the bottom of the main reactor, and the product degassing section is connected to the main reactor.

In the second method of the invention, due to the use of a metallocene compound as the catalyst precursor, the catalyst activation reactor can be omitted and the metallocene compound is directly fed into the main reactor containing the catalyst support, so that catalyst preparation and the main reaction are integrated.

According to the present invention, the catalyst and the carbon nanotube product, which exist in the form of agglomerates during the process, are kept in a state of good flowability/fluidization by control of the operation conditions.

The catalyst support can be selected from powders with good flowability, such as superfine glass beads, silicon dioxide, alumina and carbon nanotubes. By adopting the process, conditions and reactors of the present invention, carbon nanotubes having a loose agglomerated structure can be produced with agglomerate diameters of 1~1000 μm, bulk density of 20~800 kg/m$^3$, and with good flowability/fluidization properties.

The reaction apparatus of the present invention has the following outstanding characteristics:

1. It makes good use of the specific characteristics of the fluidized bed, and it has compact structure and good applicability.

2. The stuffs in the reactor are of an appropriate density such that they can be kept in a state of flow/fluidization, and this provides sufficient growing space for the carbon nanotubes and also obtains sufficient reaction capacity.

3. It can continuously supply the catalyst into and remove the carbon nanotube product out of the reactor, thus a continuous mass production can be achieved.

4. During the production of the nanosized carbon materials, the distribution of temperature and concentrations in the fluidized bed are uniform, and there is neither local overheating nor coagulation.

5. It can supply heat in and remove heat out of a scaled-up apparatus, and is suitable for the exothermic or endothermic catalytic decomposition processes. 6. The adaptability of the reactor system is excellent. The locations of the feed inlet and product outlet can be adjusted according to the requirements of the reaction residence time and the structure of the products.

BRIEF DESCRIPTION OF THE DRAWINGS

In FIG. 1, 1 is the main reactor, 2 is the gas distributor, 3 is the heat exchanger, 4 is the inlet for the catalyst, 5 is the outlet for the product, 6 is the catalyst activation reactor, 7 is the gas-solid separator, 8 is the gas feed device, 9 is the product degassing section.

EMBODIMENTS OF THE INVENTION

Figure 1:
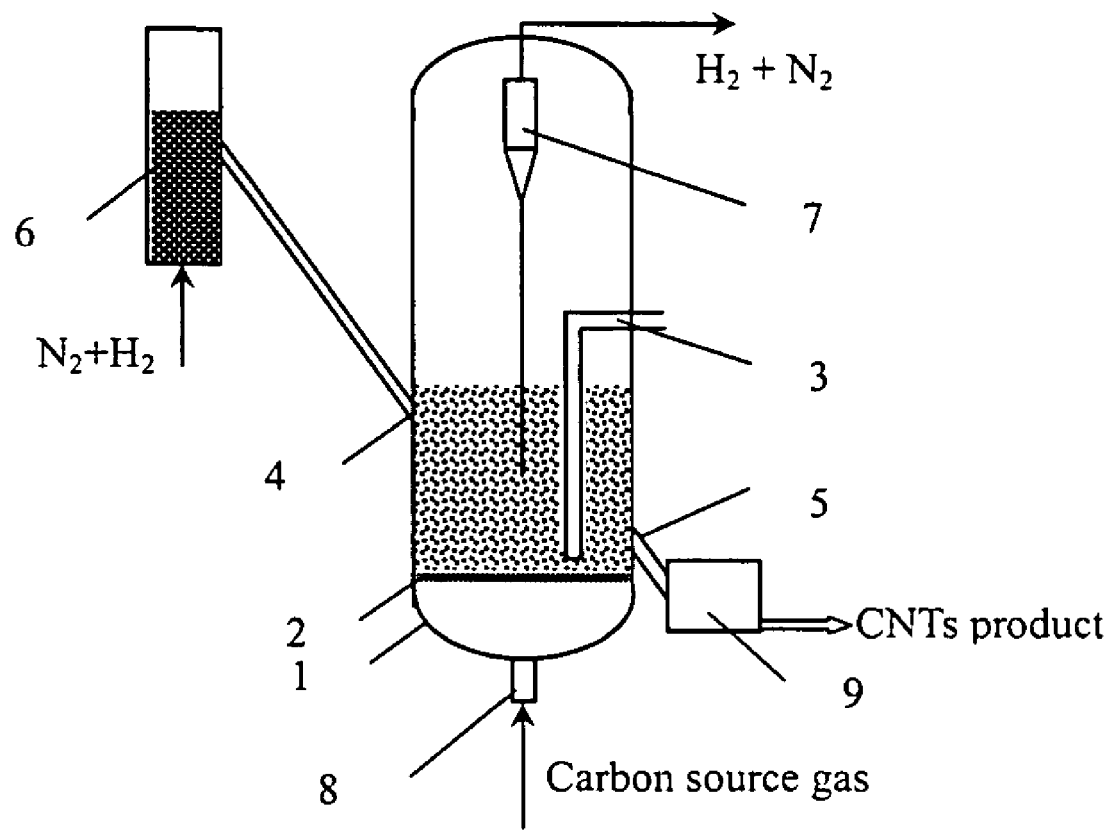
FIG. 1 is a schematic diagram of the structure of the reaction apparatus of the present invention.

As shown in FIG. 1, according to the present invention, the reaction apparatus for the continuous production of carbon nanotubes in a nano-agglomerate fluidized bed comprises a main reactor 1, a catalyst activation reactor 6, a gas distributor 2, a gas-solid separator 7 and a product degassing section 9. The catalyst activation reactor 6 is connected to the main reactor 1, the gas distributor 2 is placed in the bottom of the main reactor 1 and the gas-solid separator 7 is arranged at the top of the main reactor 1, the main reactor 1 is provided with heat exchange tubes 3 and means for feeding gases at its bottom, and the product degassing section 9 is connected to the main reactor 1 through a product outlet 5. The product outlet 5 can be used to adjust the amount of the stuffs in the main reactor. The product outlet 5 is connected to the product degassing section 9 for desorbing the organic materials absorbed on the product.

The contents of the present invention are described in details by the following examples. However, the examples are not intended to limit the scope of the invention.

EXAMPLE 1

1. Loading Fe-Cu transition metal oxides on a SiO$_2$ support.

2. Adding the above supported catalyst into the catalyst activation reactor and carrying out the reduction reaction by flowing a mixture of hydrogen and nitrogen into the reactor at 650° C., wherein the volume ratio of hydrogen to nitrogen was 1:0.5 and the space velocity of the reduction reaction was 0.5 h$^{-1}$.

3. Transporting the reduced catalyst into the fluidized bed with temperature at 700° C., feeding a mixture of hydrogen, ethylene and nitrogen into the reactor, wherein the volume ratio of $H_2:C_2^=:N_2$ was 1:1:1 and the space velocity during the reaction was kept at 10000 h$^{-1}$ and the superficial gas velocity was 0.5 m/s.

Figure 2:
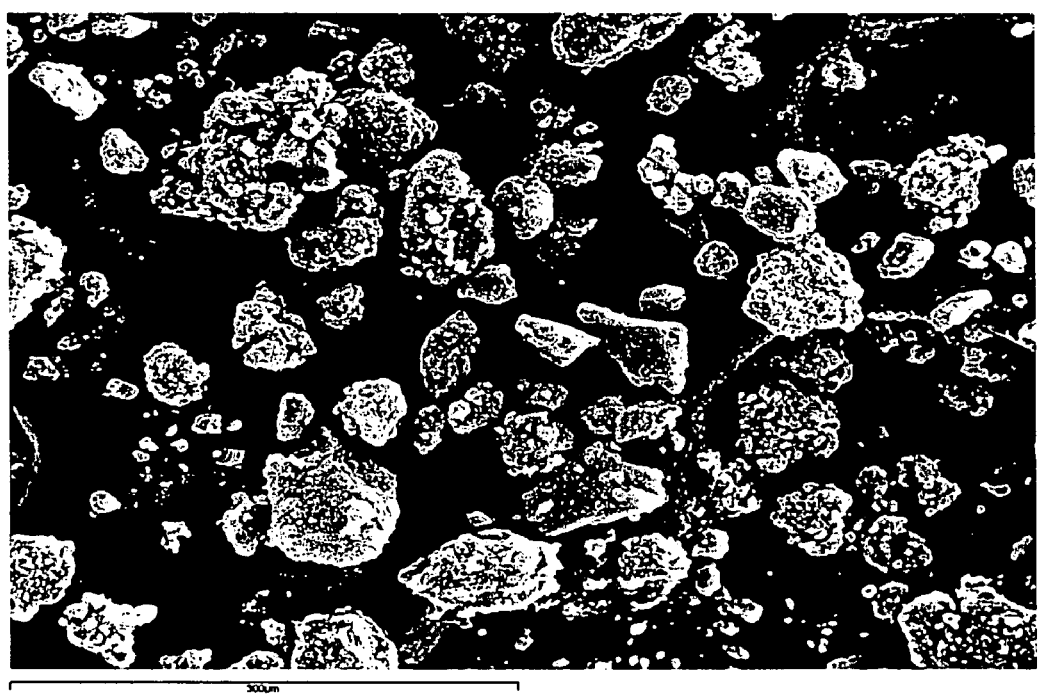
FIG. 2 is a Scanning Electron Microscope (SEM) photograph of the carbon nanotube agglomerate produced using the method and reaction apparatus of the present invention.

FIG. 2 shows a typical SEM photo of the carbon nanotubes produced in the example 1. The sample was directly obtained from the reactor and was not subjected to any purification nor pulverization. The carbon nanotubes are in the form of agglomerates, and most of the agglomerates are near spherical in shape with diameters of less than 100 μm.

Figure 3:
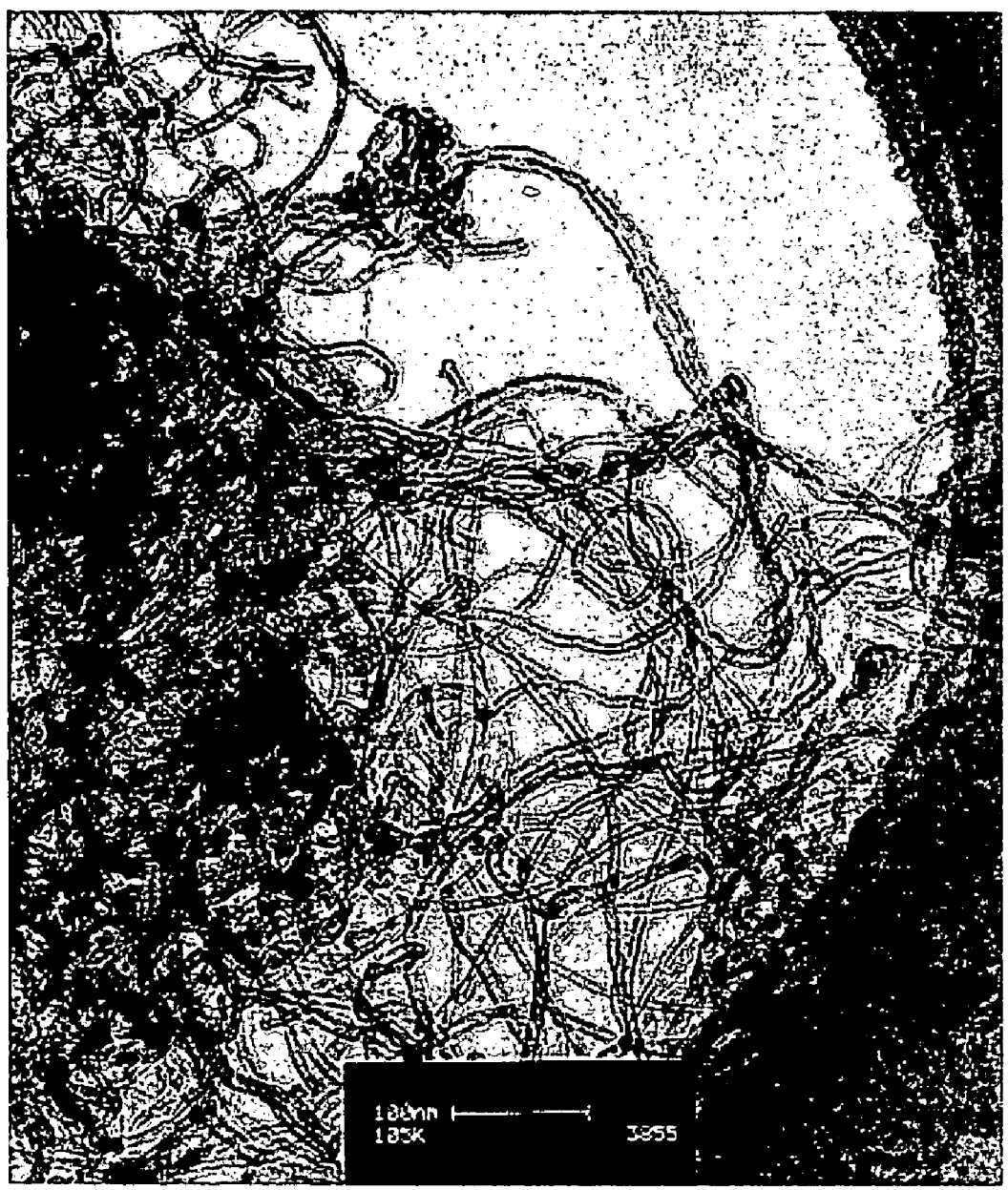
FIG. 3 is a Transmission Electron Microscope (TEM) photograph of the carbon nanotubes produced using the method and reaction apparatus of the present invention.

FIG. 3 shows a TEM photo of the above-mentioned sample. During sample preparation, a small quantity of the unpurified sample was dispersed in ethanol by ultrasonic wave, and then dripped onto a fine copper grid for Transmission Electron Microscopy observation. It can be seen from the figure that the carbon nanotubes are quite pure and have diameters of less than 10 nm, and the tubes are long and uniform in diameter.

Figure 4:
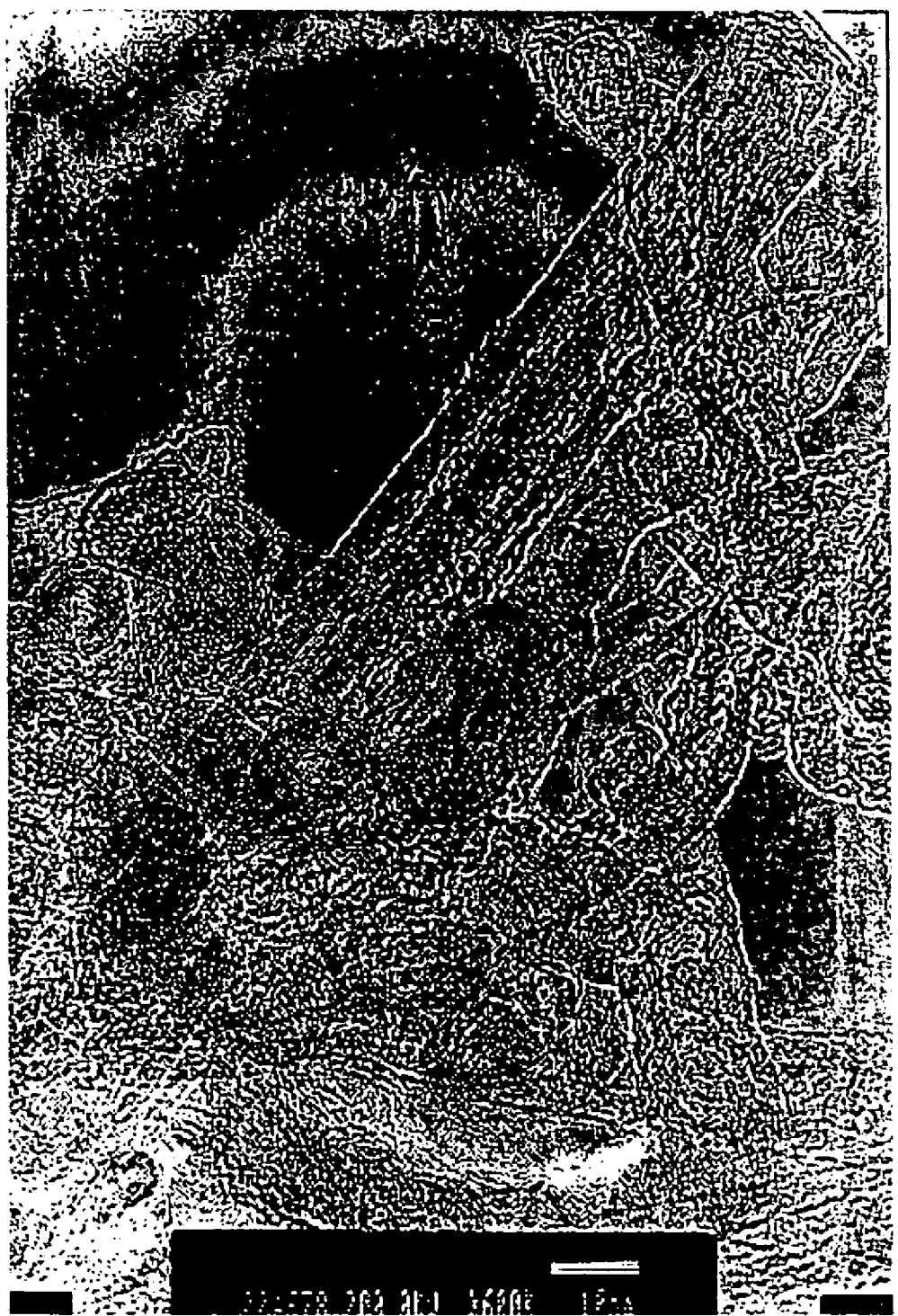
FIG. 4 is a High Resolution Transmission Electron Microscope (HRTEM) photograph of the carbon nanotubes produced using the method and reaction apparatus of the present invention.

FIG. 4 is a HRTEM photo of the sample, which was prepared by the same procedure as that for FIG. 3. From the figure, the carbon atom layers of the multi-wall carbon nanotube can be observed.

EXAMPLE 2

1. Loading Ni-Cu transition metal oxides on a glass bead support.
2. Adding the above supported catalyst into the catalyst activation reactor and carrying out the reduction reaction by flowing a mixture of hydrogen and nitrogen into the reactor at 520° C., wherein the volume ratio of hydrogen to nitrogen was 1:1 and the space velocity of the reduction reaction was 2 h$^{-1}$.
3. Transporting the reduced catalyst into the fluidized bed with temperature at 520° C., feeding a mixture of hydrogen, propylene and nitrogen into the reactor, wherein the volume ratio of $H_2:C_3^=:N_2$ is 1:1:1 and the space velocity during the reaction was kept at 5 h$^{-1}$ and the superficial gas velocity was 0.09 m/s.

EXAMPLE 3

1. Loading Co-Mn transition metal oxides on a $Al_2O_3$ support.
2. Adding the above supported catalyst into the catalyst activation reactor and carrying out the reduction reaction by flowing a mixture of hydrogen and nitrogen into the reactor at 800° C., wherein the volume ratio of hydrogen to nitrogen was 1:0.5 and the space velocity of the reduction reaction was 0.3 h$^{-1}$.
3. Transporting the reduced catalyst into the fluidized bed with temperature at 870° C., feeding a mixture of hydrogen, methane and nitrogen into the reactor, wherein the volume ratio of $H_2:CH_4:N_2$ was 0.5:1:0.1 and the space velocity during the reaction was kept at 5000 h$^{-1}$, and the superficial gas velocity was 0.8 m/s.

EXAMPLE 4

1. Loading Ni transition metal oxide on a $Al_2O_3$ support.
2. Adding the above supported catalyst into the catalyst activation reactor and carrying out the reduction reaction by flowing a mixture of carbon monoxide and nitrogen into the reactor at 870° C., wherein the volume ratio of carbon monoxide to nitrogen was 1:0.5 and the space velocity of the reduction reaction was 3 h$^{-1}$.
3. Transporting the reduced catalyst into the fluidized bed with temperature at 870° C., feeding a mixture of hydrogen, ethylene and nitrogen into the reactor, wherein the volume ratio of $H_2:C_2^=:N_2$ was 1:1:0.5 and the space velocity during the reaction was kept at 8000 h$^{-1}$ and the superficial gas velocity was 1.3 m/s.

EXAMPLE 5

1. Loading Ni-Cu transition metal oxides on a $Al_2O_3$ support.
2. Adding the above supported catalyst into the catalyst activation reactor and carrying out the reduction reaction by flowing a mixture of hydrogen and nitrogen into the reactor at 870° C., wherein the volume ratio of hydrogen to nitrogen was 1:0.5 and the space velocity of the reduction reaction was 0.5 h$^{-1}$.
3. Transporting the reduced catalyst into the fluidized bed with temperature at 870° C., feeding a mixture of hydrogen, methane and nitrogen into the reactor, wherein the volume ratio of $H_2:CH_4:N_2$ was 1:1:0.5 and the space velocity during the reaction was kept at 9000 h$^{-1}$, and the superficial gas velocity was 1.7 m/s.

EXAMPLE 6

1. Carbon nanotubes were placed in the main reactor as catalyst support.
2. Dissolving ferrocene in benzene, vaporizing the solution, and then feeding the obtained vapor together with propylene and nitrogen into the main reactor at 650° C., wherein the volume ratio of propylene:nitrogen:benzene:ferrocene equals 1:0.3:0.2:0.02, the superficial gas velocity was 0.1 m/s and the space velocity was 200 h$^{-1}$, the ferrocene was dissociated to form metal nano-particles supported on the carbon nanotube supports, and under the catalytic action of the metal nano-particles, the carbon-source gas was decomposed and new carbon nanotubes were obtained.

The invention claimed is:

1. A method for continuous production of carbon nanotubes in a nano-agglomerate fluidized bed, comprising:
   1) loading transition metal oxide on a support to form a transition metal catalyst;
   2) adding said transition metal oxide catalyst into a catalyst activation reactor, flowing a mixture of (i) nitrogen and hydrogen or (ii) a mixture of nitrogen and carbon monoxide into the reactor at 500-900° C. to reduce nanosized transition metal oxide particles to nanosized metal particles, wherein the volume ratio of hydrogen or carbon monoxide to nitrogen is 1:0.3 to 1:1, the space velocity during the reduction reaction is from 0.3 h$^{-1}$ to 3h$^{-1}$ and the catalyst is in the form of nano-agglomerates, which have diameters between 1~1000 μm; and
   3) transporting the catalyst into a fluidized-bed reactor, flowing a mixture of (a) a carbon-source-gas which is a gas of lower hydrocarbons having less than 7 carbon atoms, (b) nitrogen and (c) either hydrogen or carbon monoxide into the reactor at 500-900° C., wherein the volume ratio of hydrogen or carbon monoxide:carbon-source-gas:nitrogen equals 0.4-1:1:0.1-2, the space velocity during the reaction is 5-10000 h$^{-1}$, the superficial gas velocity is 0.08-2 m/s, the bed density is maintained at 20-800 kg/m$^3$, and the nano-agglomerates of the catalyst and the carbon nanotube product are kept in a dense-phase fluidization state to form carbon nanotube agglomerates, each having a diameter between 1 μm and about 1000 μm, as a result, crystalline carbon nanotubes are obtained from the fluidized-bed reactor, wherein the carbon nanotubes are free of amorphous carbon deposits.

2. The method of claim 1, wherein the catalyst support is superfine glass beads, $SiO_2$, $Al_2O_3$ or carbon nanotubes.

3. The method of claim 1, wherein the transition metal oxide is Fe-Cu oxide, Ni-Cu oxide, Co-Mn oxide or Ni oxide.

4. A method of claim 1, which is carried out in a nano-agglomerate fluidized bed reaction apparatus, which apparatus comprises a main reactor (1), a catalyst activation reactor (6), a gas distributor (2), a gas-solid separator (7) and a product degassing section (9), wherein the catalyst activation reactor (6) is connected to the main reactor (1), the gas distributor (2) is placed in the bottom of the main reactor (1), the gas-solid separator (7) is arranged at the top of the main reactor (1), the main reactor (1) is provided with heat exchange tubes (3) and means for feeding gases at its bottom, and the product degassing section (9) is connected to the main reactor (1) through a product outlet (5).

5. The method of claim 1, which is carried out in a fluidized-bed reactor, which comprises a main reactor (1), a gas distributor (2), a gas-solid separator (7) and a product degassing section (9), the main reactor (1) is connected to a catalyst activation reactor (61, the gas distributor (2) is placed in the bottom of the main reactor (1), the gas-solid separator (7) is arranged at the top of the main reactor (1), the main reactor (1) is provided with heat exchange tubes (3) and a gas feeder at its bottom, and the product degassing section (9) is connected to the main reactor (1) through a product outlet (5).

6. The method of claim 1, wherein the carbon nanotubes obtained from the fluidized-bed reactor form a carbon nanotube agglomerate, which comprises:
    a plurality of transition metal nanoparticles;
    a solid support, wherein said plurality of metal nanoparticles and said support are combined to form a plurality of catalyst nano agglomerates; and
    a plurality of multi-walled carbon nanotubes deposited on said plurality of catalyst nano agglomerates.

7. The method of claim 6, wherein the carbon nanotube agglomerate has a diameter of about 1 μm to about 1000 μm.

8. The method of claim 6, wherein said plurality of catalyst nano agglomerates have a diameter of about 1 μm to about 1000 μm.

9. A method for continuous production of carbon nanotubes in a nano-agglomerate fluidized bed, comprising:
    1) placing a catalyst support in the fluidized-bed reactor, wherein the diameters of the agglomerates of the catalyst support are in the range of 1-1000 μm and the bed density of the reactor is 20-1500 kg/m$^3$ so that the catalyst support can be fluidized;
    2) dissolving a metallocene compound in a low carbon number organic solvent;
    3) heating the above solution to a temperature higher than the boiling point of the organic solvent to vaporize the solution; and
    4) feeding the above vaporized catalyst precursor into the fluidized-bed reactor, flowing a mixture of (a) a carbon-source-gas which is a gas of lower hydrocarbons having less than 7 carbon atoms, (b)nitrogen and (c) either hydrogen or carbon monoxide into the reactor at 500-900° C., wherein the volume ratio of hydrogen or carbon monoxide:carbon-source-gas:nitrogen equals 0.4-1:1: 0.1~2, the space velocity during the reaction is 5-10000 h$^{-1}$, the superficial gas velocity is 0.005-2 m/s, and the stuffs in the reactor are kept in a dense-phase fluidization state to form carbon nanotube agglomerates, each having a diameter between 1 μm and about 1000 μm, as a result, crystalline carbon nanotubes are obtained from the fluidized-bed reactor, wherein the carbon nanotubes are free of amorphous carbon deposits.

10. The method of claim 9, wherein the catalyst support is superfine glass beads, $SiO_2$, $Al_2O_3$ or carbon nanotubes.

11. The method of claim 9, which is carried out in a fluidized-bed reactor, which comprises a main reactor (1), a gas distributor (2), a gas-solid separator (7) and a product degassing section (9), the gas distributor (2) is placed in the bottom of the main reactor (1), the gas-solid separator (7) is arranged at the top of the main reactor (1), the main reactor (1) is provided with heat exchange tubes (3) and a gas feeder at its bottom, and the product degassing section (9) is connected to the main reactor (1) through a product outlet (5).

12. The method of claim 9, wherein the carbon nanotubes obtained from the fluidized-bed reactor form a carbon nanotube agglomerate, which comprise a plurality of transition metal nanoparticles; a solid support, wherein said plurality of transition metal nanoparticles and said solid support are combined to form a plurality of catalyst nano agglomerates; and a plurality of multi-walled carbon nanotubes deposited on said plurality of catalyst nano agglomerates.

13. The method of claim 12, wherein the carbon nanotube agglomerate has a diameter of about 1 μm to about 1000 μm.

14. The method of claim 12, wherein said plurality of catalyst nano agglomerates have a diameter of about 1 μm to about 1000 μm.

15. A method of claim 9, which is carried out: in a nano-agglomerate fluidized bed reaction apparatus, which apparatus comprises a main reactor (1), a catalyst activation reactor (6), a gas distributor (2), a gas-solid separator (7) and a product degassing section (9), wherein the catalyst activation reactor (6) is connected to the main reactor (1), the gas distributor (2) is placed in the bottom of the main reactor (1), the gas-solid separator (7) is arranged at the top of the main reactor (1), the main reactor (1) is provided with heat exchange tubes (3) and a gas feeder at its bottom, and the product degassing section (9) is connected to the main reactor (1) though a product outlet (5).

* * * * *